March 7, 1933.  C. W. KANOLT  1,900,566
DEPTHOGRAPH PLATE HOLDER
Filed May 23, 1930   3 Sheets-Sheet 1

INVENTOR
Clarence W. Kanolt
BY Harry Lea Dodson
ATTORNEY

March 7, 1933.   C. W. KANOLT   1,900,566
DEPTHOGRAPH PLATE HOLDER
Filed May 23, 1930   3 Sheets-Sheet 2

INVENTOR
*Clarence W. Kanolt*
BY *Harry Lea Dodson*
ATTORNEY

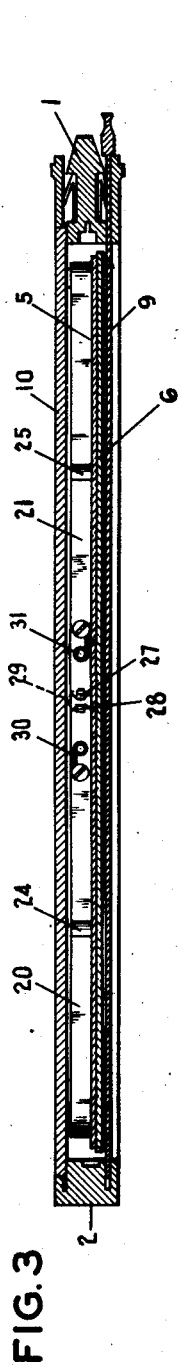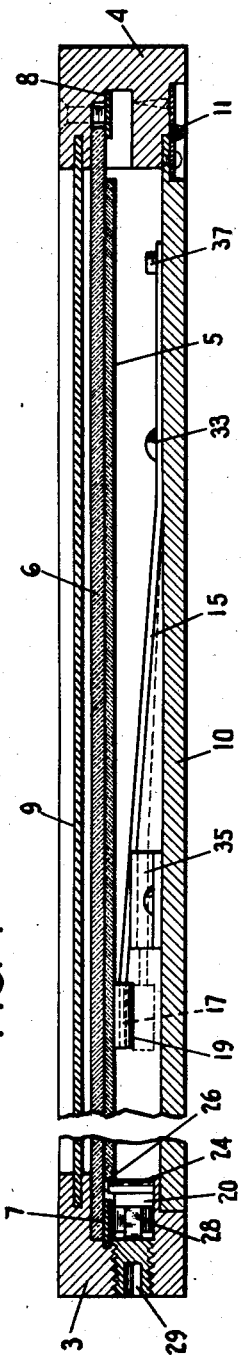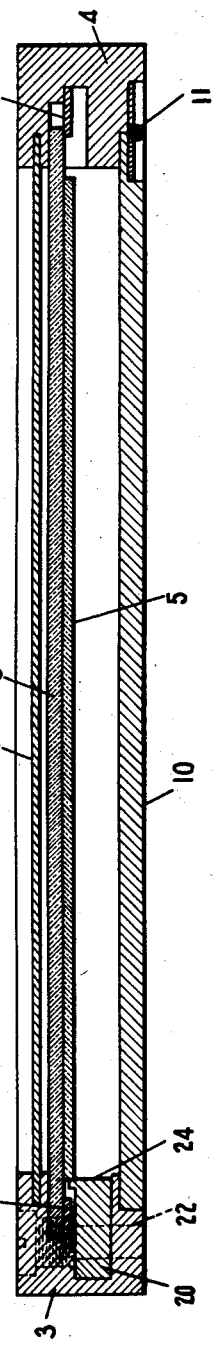

Patented Mar. 7, 1933

1,900,566

UNITED STATES PATENT OFFICE

CLARENCE W. KANOLT, OF NEW YORK, N. Y.

DEPTHOGRAPH PLATE HOLDER

Application filed May 23, 1930. Serial No. 454,862.

My invention is designed as an improvement upon the plate holder set forth in my copending application, Serial No. 454,861, and relates more specifically to plate holders which are to be used in connection with a camera designed to follow the methods set forth in my United States Patent No. 1,260,662, issued March 26, 1918, in which a stereoscopic picture is produced by moving the camera in an arc about the object to be photographed, and at the same time moving the plate, upon which the object is being photographed, past a lined screen, the distance the plate is moved during the exposure being substantially the distance from one transparent line to the next, on the lined screen.

I have employed the trade-mark "Depthograph", covered by certificate of registration No. 261,335, issued September 17, 1929, as properly describing stereoscopic pictures produced by following the method described in my hereinbefore mentioned patent.

In work of this character it is essential that the lined screen be held against movement, that the movement of the plate be smooth and steady, and that such movement be uniform at both the top and the bottom of the plate, it being apparent to persons skilled in the art that a comparatively slight discrepancy in the movement at either the top or the bottom of the plate will entirely destroy the utility of the plate, and the negative will be valueless for use as a depthograph.

My invention has for its object, to produce a plate holder which can be much more easily loaded, and to provide means for pushing upon the plate at two points, thus overcoming any tendency to bind on either the top or the bottom of the plate, and consequently to insure their moving equal distances simultaneously.

My holder varies from the ordinary plate holder, in that I omit the back opaque slide, and provide an opaque slide for the front of the holder, and a door for the back, thus making it very much more convenient to load. Besides, as will be apparent from the hereinafter contained description, I provide means on the door to insure the close contact of the photographic plate against the lined screen, as well as to hold the plate against the mechanism which moves it.

A concrete embodiment of my device is illustrated in the accompanying drawings, which are to be considered as a part of this specification, in which—

Fig. 3 is a sectional view, taken on line 3—3 in Fig. 1;

Fig. 4 is a sectional view, taken on line 4—4 in Fig. 1; and

Fig. 5 is a sectional view, taken on line 5—5 in Fig. 1, in the direction indicated by the arrows. Similar reference numerals refer to similar parts throughout the entire description.

Figure 1:
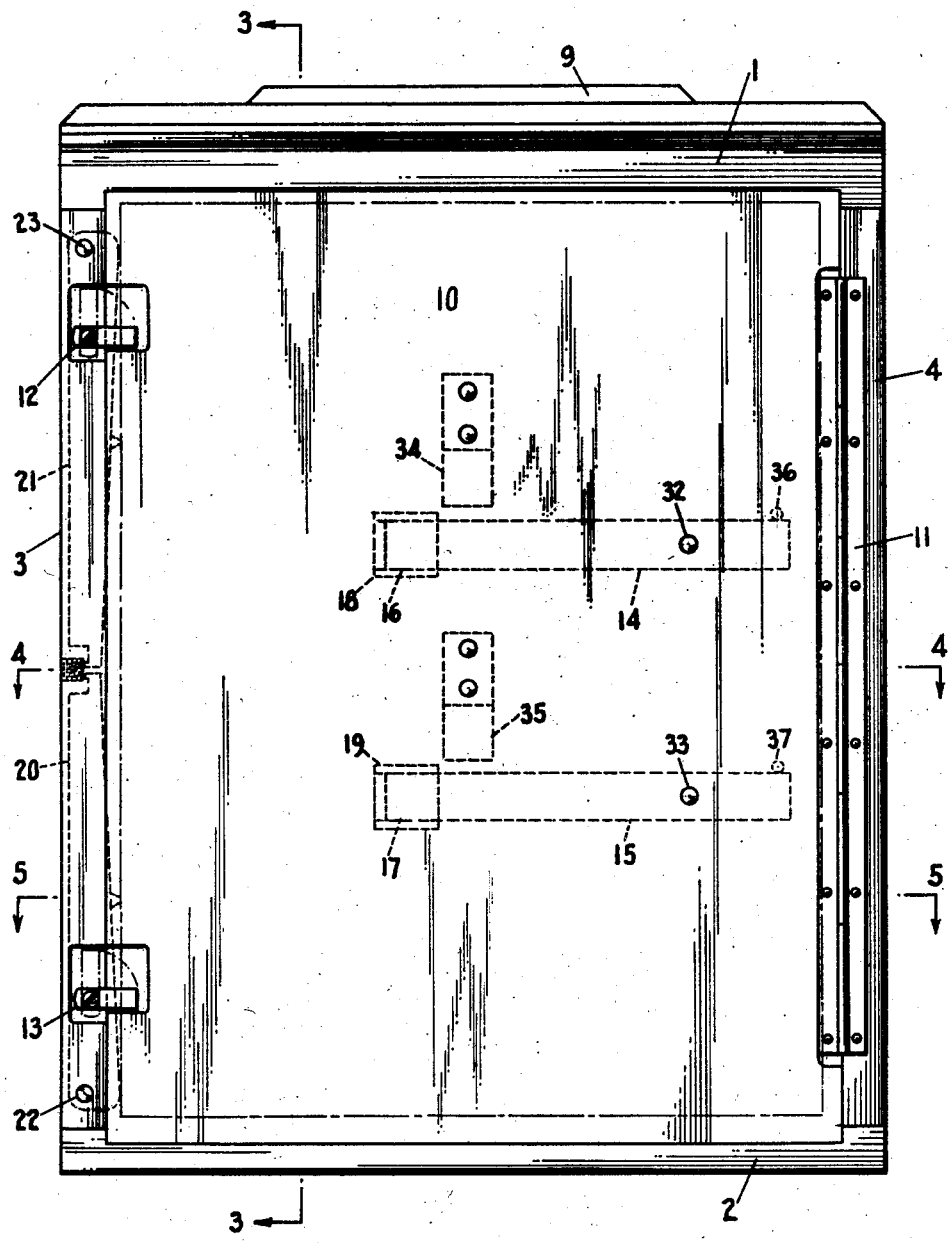
Fig. 1 is a rear elevation of my improved depthograph plate holder, showing the door.
Figure 2:
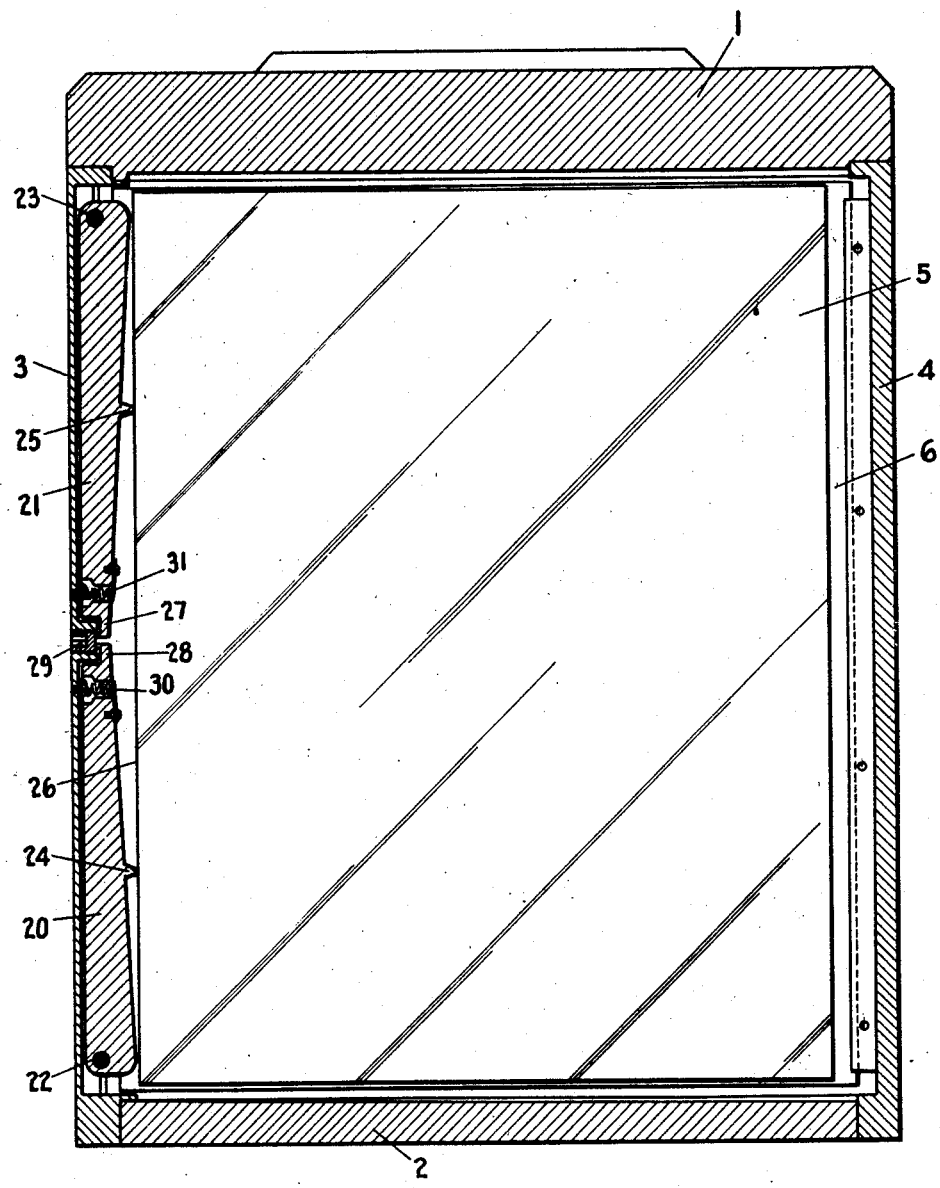
Fig. 2 is a vertical sectional view.

As shown in the drawings, my plate holder comprises a frame having top, 1, bottom 2, and sides 3 and 4. The side 3, which carries the mechanism for moving the photographic plate 5, must be formed of unyielding material, of sufficient size and thickness to insure its rigidity during the operation of the plate-moving mechanism.

A lined screen 6 is mounted within the plate holder, and held against movement by means of clamping strips 7 and 8. A slide 9, of opaque material, is provided in the front of the holder, and a door 10 in the back thereof. This door 10 is provided with hinges 11, and is held closed by means of bars 12 and 13.

Mounted upon the inner face of the door 10 are springs 14 and 15, the function of which is to press the photographic plate 5 tightly against the lined screen 6 and against the pushing mechanism, and hold it in contact therewith, when the door 10 is in closed position. Mounted upon the ends 16 and 17 of the springs 14 and 15 are rubber buffers 18 and 19, the function of which is to give the springs 14 and 15 a better purchase on the photographic plate 5.

Mounted in side 3 of the plate holder, which side 3 is formed of unyielding material, is the mechanism for moving the photographic plate 5. This mechanism comprises two levers 20 and 21, which are mounted upon pivots 22 and 23. Protuberances 24 and 25 are formed integral with said levers 20 and 21. These protuberances are provided to engage the edge 26 of the photographic plate 5. The inner ends 27 and 28 of the levers 20 and 21 are engaged by a screw 29 mounted in the side 3 of the plate holder.

In practice I have found it desirable so to proportion the pitch of this screw 29 that a single turn thereof will swing the levers 20 and 21 upon their pivots 22 and 23 a sufficient distance to cause the protuberances 24 and 25 to move the photographic plate 5 the required distance.

I provide means for holding these levers 20 and 21 normally in engagement with this screw 29. As illustrated, this means consists of springs 30 and 31, mounted in the levers 20 and 21, the tension of these springs 30 and 31 being such as to hold the ends 27 and 28 of the levers 20 and 21 in engagement with the end of the screw 29 at all times.

The operation of loading the plate holder is described as follows:

The photographic plate 5 is laid in the plate holder, having its sensitized face against the lined screen 6, and its edge 26 against the protuberances 24 and 25. The door 10 is then closed, and fastened by means of the bars 12 and 13. The closing of the door 10 compresses the springs 14 and 15 against the photographic plate 5, pressing it tightly against the lined screen 6. It will be obvious that they not only exert a force tending to hold the plate 5 tightly against the lined screen 6, but there is also some lateral pressure exerted by the attempt to straighten out the springs 14 and 15. This is rendered more effective by the use of the rubber buffers 18 and 19 placed on the ends 16 and 17 of the springs 14 and 15, and insures holding the ends 26 of the plate 5 in contact with the protuberances 24 and 25 from the time the door 10 is closed.

The springs 14 and 15 are swingingly mounted upon rivets 32 and 33. When the plate holder contains no photographic plate 6, it is desirable to prevent said springs 14 and 15 from pressing against the lined screen 6, as such pressure might produce damage. This is accomplished by means of catches 34 and 35, which are secured to the door 10, so that the springs 14 and 15 can be swung upon the rivets 32 and 33 and their ends secured under the catches 34 and 35. Detents 36 and 37 are provided, to locate the springs 14 and 15 in the correct position which they are released from the catches 34 and 35 and swung about upon the rivets 32 and 33.

For the purpose of full disclosure of my invention, I have described in some detail a specific embodiment thereof; but it will be apparent that numerous changes might be made in the physical embodiment of my invention, within the scope of the appended claims, and I do not therefore desire to be understood as limiting myself, in the broader aspect of my invention, to the specific construction shown and described. In some cases it may be found desirable to move the screen and hold the photographic plate stationary. Obviously that would not depart from the scope of my invention.

Having described my invention, what I regard as new, and desire to obtain by Letters Patent of the United States, is:

1. In a plate holder having a top, bottom and sides, one side of said holder being made of unyielding material, an opaque closure for its front, an opaque closure for its rear, a lined screen fixedly mounted in said holder, a photographic plate adjacent to said screen, a pair of swinging levers pivotally secured to said unyielding side of said holder, protuberances on said levers which abut the edge of said plate, and a screw, mounted in said unyielding side of said holder, which engages the inner ends of said levers, whereby the rotating of said screw swings said levers and moves said plate.

2. In a plate holder having a top, bottom and sides, one side of said holder being made of unyielding material, an opaque closure for the front of said holder, an opaque closure for its rear, a lined screen fixedly mounted in said holder, a photographic plate adjacent to said screen, a pair of swinging levers pivotally secured to said unyielding side of said holder, protuberances on said levers which abut the edge of said plate, a screw mounted in said unyielding side of said holder, which engages the inner ends of said levers, whereby the rotating of said screw swings said levers and moves said plate, and means to hold the inner ends of said levers against said screw.

3. In a plate holder having a top, bottom and sides, one side of said holder being made of unyielding material, an opaque closure for the front of said holder, an opaque closure for its rear, a lined screen fixedly mounted in said holder, a photographic plate adjacent to said screen, a pair of swinging levers pivotally secured to said unyielding side of said holder, protuberances formed integral with said levers which abut the edge of said plate, and rotatable means to swing said levers and move said plate.

4. In a plate holder having a top, bottom and sides, one side of said holder being made of unyielding material, an opaque closure for the front of said holder, an opaque closure for its rear, a lined screen fixedly mounted in said holder, a photographic plate adjacent to said screen, a pair of swinging levers pivotally secured to said unyielding side of the holder, means carried by said levers which move said plate when said levers are swung inwardly on said pivots, and a screw, mounted in said unyielding side of the holder, which engages the inner ends of said levers, whereby the rotating of said screw swings said levers and moves said plate.

5. In a plate holder having a top, bottom and sides, one side of said holder being made of unyielding material, an opaque closure for the front of said holder, an opaque closure for its rear, a lined screen fixedly mounted in said holder, a photographic plate adjacent to said screen, a pair of swinging levers pivotally secured to said unyielding side of the holder, protuberances on said levers which abut the edge of said plate, a screw, mounted in said unyielding side of the holder, which engages the inner ends of said levers, whereby the rotating of said screw swings said levers and moves said plate, and tension means secured to said rear closure, which press said plate against said screen and against said protuberances, when said rear closure is moved inwardly.

6. In a plate holder having a top, bottom and sides, one side of said holder being made of unyielding material, an opaque closure for the front of said holder, an opaque closure for its rear, a lined screen fixedly mounted in said holder, a photographic plate adjacent to said screen, a pair of swinging levers pivotally secured to said unyielding side of the holder, protuberances on said levers which abut the edge of said plate, a screw, mounted in said unyielding side of the holder, which engages the inner ends of said levers, whereby the rotating of said screw swings said levers and moves said plate, and springs, secured to said rear closure, which press said plate against said screen and against said protuberances, when said rear closure is moved inwardly.

7. In a plate holder having a top, bottom and sides, one side of said holder being made of unyielding material, an opaque closure for the front of said holder, an opaque closure for its rear, a lined screen mounted in said holder, a photographic plate adjacent to said screen, a pair of swinging levers pivotally secured to said unyielding side of the holder, protuberances on said levers, which abut the edge of said screen, a screw, mounted in said unyielding side of the holder, which engages the inner ends of said levers, whereby the rotating of said screw swings said levers and moves said screen, and means to press said screen against said protuberances when said rear closure is moved inwardly.

8. In a plate holder having a top, bottom and sides, one side of said holder being made of unyielding material, an opaque closure for the front of said holder, an opaque closure for its rear, a lined screen fixedly mounted in said holder, a photographic plate adjacent to said screen, a pair of swinging levers pivotally secured to said unyielding side of the holder, protuberances on said levers, which abut the edge of said plate, a screw, mounted in said unyielding side of the holder, which engages the inner edge of said levers, whereby the rotating of said screw swings said levers and moves said plate, springs, secured to said rear closure, which press said plate against said screen and against said protuberances, when said rear closure is moved inwardly, and means to hold said springs in retracted position.

CLARENCE W. KANOLT.